July 29, 1930.  W. WALTHER  1,771,830
MAGNETO
Filed Sept. 1, 1927
Fig. 1
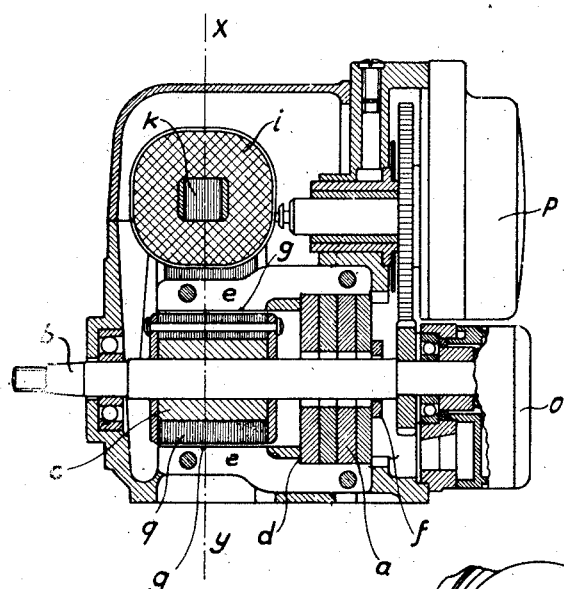
Fig. 2
Fig. 3
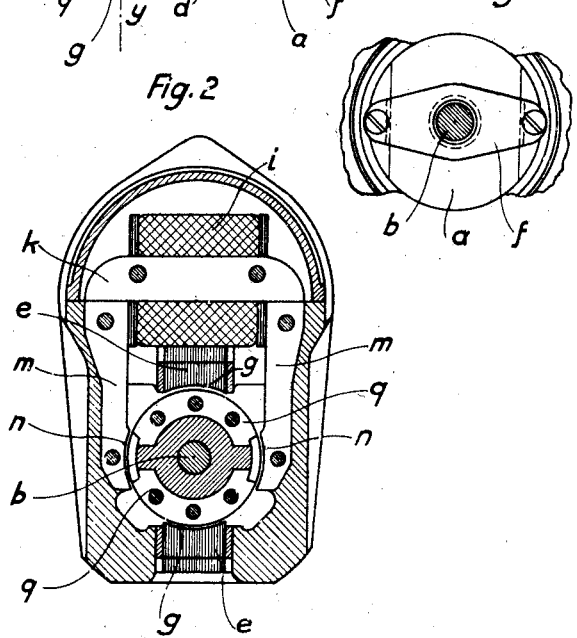
Inventor
Wilhelm Walther
by Steward & McKey
His Attorneys Patented July 29, 1930

1,771,830

UNITED STATES PATENT OFFICE

WILHELM WALTHER, OF STUTTGART, GERMANY, ASSIGNOR TO ROBERT BOSCH AKTIEN-GESELLSCHAFT, OF STUTTGART, GERMANY

MAGNETO

Application filed September 1, 1927, Serial No. 216,985, and in Germany September 29, 1926.

The invention relates to magneto electric machines for the ignition arrangements of multi-cylinder engines.

It is known to make both the magnet and the armature carrying the induction coil stationary and to conduct the lines of force from the magnet pole shoes to the armature through a rotating body.

An object of this invention is to considerably simplify and cheapen the manufacture. For this purpose an annular or circular permanent magnet is arranged coaxially adjacent the flux distributer so that the pole shoes are parallel to the axis of rotation. The inner curved faces of the pole shoes enclosing the flux distributer and the curved faces for the connection with the permanent magnet thus lie behind one another and concentrically of the axis of rotation. It is consequently possible to machine both these faces in a single operation by turning. In the construction hitherto usual two operations were necessary for this purpose and when using horseshoe permanent magnets, the faces for the connection with the pole shoes had to be made by an expensive milling process.

One form of construction according to the invention is described by way of example with reference to the accompanying drawings in which:—

Figure 1 is a vertical longitudinal section of a magneto.

Figure 2 is a cross section along the line x—y in Figure 1 and

Figure 3 shows a detail on a larger scale.

The permanent magnet a consists of a plurality of flat bar magnets, which, as shown in Figure 3, are of circular shape with two segments cut away. A central hole is provided to allow passage of the steel shaft b of the flux distributer q. The flux distributer q is carried by the shaft b through the medium of a supporting hub c of non-magnetic material fixed to the shaft in any suitable manner, as by a driving fit. The bundle of magnets a is secured against axial displacement by being pressed against shoulders d on the pole shoes e by a plate f mounted in the magneto housing by means of screws. The plate f has projections at both ends which grip the magnets laterally and so prevent rotation of the same about their axis which coincides with the axis of rotation of the flux distributer q.

As can be seen from Figure 1 the bundle of magnets is located co-axially alongside the flux distributer q. This requires the pole shoes e to be disposed parallel to the shaft b. The inner curved faces g of the pole shoes facing the flux distributer, and the curved faces h for connecting the pole shoes with the magnets a are consequently located concentrically of the axis which is common to the flux distributer and the bundle of permanent magnets. Thus the pole shoe faces g and h can during manufacture be simultaneously machined in one operation by turning.

The winding i of the magnets is mounted on a fixed armature core k to which are attached armature shoes m. The inner curved faces n of these shoes extend over the periphery of the flux distributer q, together with the inner faces g of the pole shoes e. They may also be machined in common with the faces g and h. The winding i consists as usual of low tension and high tension windings, which may be electrically connected with the contact breaker o and the distributer p in known manner.

The armature core k, pole shoes e and m, and flux distributer q on the non-magnetic hub c, are made of sheet iron laminae. The pole shoes e and m are mounted in the housing by casting the latter around the pole shoes.

The magnetic circuit may be traced as follows: upper end of permanent magnet a, upper pole shoe e, uppermost segment of distributer q, pole shoe m nearest to uppermost segment of q, armature core k, other pole shoe m nearest to lowermost segment of distributer q, lowermost segment of distributer q, lower pole shoe e back to lower end of permanent magnet a.

I claim:

1. A magneto comprising in combination a stationary armature having windings and opposed arcuate pole pieces, a stationary permanent magnet, a rotary magnetic flux distributer situated between said armature pole pieces coaxial therewith, and pole shoes for conducting the flux from said permanent magnet to said distributor, said pole shoes abutting the said magnet, and extending parallel with the axis of rotation of the flux distributer and having their pole faces and also the abutment surfaces between them and the magnet arrangement curved and concentric to said axis of rotation.

2. A magneto comprising in combination a stationary armature having windings and opposed arcuate pole pieces, a stationary disc shaped, permanent magnet, a rotary magnetic flux distributer situated between said armature pole pieces coaxial therewith, and pole shoes for conducting the flux from said permanent magnet to said distributor, said pole shoes abutting the said magnet, and extending parallel with the axis of rotation of the flux distributer and having their pole faces and also the abutment surfaces between them and the permanent magnet curved and concentric to said axis of rotation.

3. A magneto comprising in combination a stationary armature having windings and opposed arcuate pole pieces, a stationary magnet having arcuate polar surfaces, a rotary magnetic flux distributer situated between said armature pole pieces coaxial therewith, and pole shoes for conducting the flux from said permanent magnet to said distributer, said pole shoes abutting the said magnet at said polar surfaces and extending parallel with the axis of rotation of the flux distributer and having their pole faces and also the abutment surfaces between them and the polar surfaces of the stationary magnet concentric to said axis of rotation.

4. A magneto comprising in combination a stationary armature having windings and opposed arcuate pole pieces, a stationary permanent magnet, a rotary magnetic flux distributer situated between said armature pole pieces coaxial therewith, and pole shoes for conducting the flux from said permanent magnet to said distributer having pairs of machined faces co-axial and lying respectively opposite the flux distributer and enclosing the magnet.

5. A magneto comprising in combination a stationary armature having windings and opposed, arcuate pole-pieces, a permanent magnet having arcuate polar faces, a rotary magnetic flux distributer situated between said armature pole-pieces co-axial therewith, and pole shoes having pairs of arcuate faces co-axial and lying respectively opposite the periphery of the flux distributer and in contact with the arcuate polar faces of the permanent magnet.

6. A magneto comprising in combination, a stationary armature having windings and opposed, arcuate pole-pieces, a permanent magnet, a flux distributer situated between said armature pole-pieces co-axial therewith and pole shoes extending from said magnet to the distributer for conducting the flux from said permanent magnet to said distributer, said pole shoes and magnet being arranged in fixed contact through arcuate surfaces.

In testimony whereof I have hereunto affixed my signature.

WILHELM WALTHER.